(12) United States Patent
Mestha et al.

(10) Patent No.: US 8,054,505 B2
(45) Date of Patent: Nov. 8, 2011

(54) METHOD, APPARATUS AND SYSTEM FOR MATCHING COLOR GAMUTS OF MULTIPLE IMAGE TRANSFER DEVICES

(75) Inventors: Lalit Keshav Mestha, Fairport, NY (US); Prudhvi Krishna Gurram, Rochester, NY (US); Alvaro Enrique Gil, Rochester, NY (US); Palghat Ramesh, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 469 days.

(21) Appl. No.: 12/352,350

(22) Filed: Jan. 12, 2009

(65) Prior Publication Data

US 2010/0177366 A1 Jul. 15, 2010

(51) Int. Cl.
*G03F 3/08* (2006.01)

(52) U.S. Cl. ........ 358/1.9; 358/3.23; 358/518; 358/504; 358/502; 358/525; 399/53

(58) Field of Classification Search .................... 358/1.9, 358/3.23, 504, 518, 519, 520, 521, 525; 399/49, 399/53
See application file for complete search history.

(56) References Cited

U.S. PATENT DOCUMENTS

| | | | |
|---|---|---|---|
| 5,313,291 A | | 5/1994 | Appel et al. |
| 5,749,021 A | * | 5/1998 | Mestha et al. ........... 399/49 |
| 5,754,918 A | | 5/1998 | Mestha et al. |
| 5,764,795 A | | 6/1998 | Takeo et al. |
| 5,950,040 A | | 9/1999 | Mestha et al. |
| 6,697,582 B1 | * | 2/2004 | Scheuer .................... 399/49 |
| 7,123,850 B1 | | 10/2006 | Hamby et al. |
| 7,162,169 B1 | | 1/2007 | Lestrange |
| 7,411,700 B2 | * | 8/2008 | Johnson .................. 358/1.9 |
| 2005/0088672 A1 | * | 4/2005 | Johnson .................. 358/1.9 |
| 2006/0197966 A1 | * | 9/2006 | Viturro et al. ........... 358/1.9 |
| 2010/0149567 A1 | * | 6/2010 | Kanazawa et al. ...... 358/1.9 |

OTHER PUBLICATIONS

Nelder et al., "A simplex method for function minimization," *Computer Journal.* 7:308-313, 1965.

* cited by examiner

*Primary Examiner* — Kimberly A Williams
(74) *Attorney, Agent, or Firm* — Oliff & Berridge, PLC (57) ABSTRACT

A method for adjusting the gamuts of a set of printers to match the gamuts across a population of printers using mass targets. The method involves printing color patches suitably positioned in the color gamut with CMYK separations and simultaneously actuating DMA targets to the level 2 controls of the printers using closed loop control algorithms. An extreme MIMO control algorithm is used to converge to the desired L*a*b* targets by adjusting mass targets to the printing system in an iterative fashion to maximize the common intersection gamut across the printers.

13 Claims, 11 Drawing Sheets

(3 of 11 Drawing Sheet(s) Filed in Color)

METHOD, APPARATUS AND SYSTEM FOR MATCHING COLOR GAMUTS OF MULTIPLE IMAGE TRANSFER DEVICES

BACKGROUND

The exemplary embodiments are directed to a method and system for employing a control algorithm to converge desired colorimetric color space targets by adjusting mass targets of printing systems in an iterative fashion.

To allow image output from a color printer, a color copier, etc., color conversion needs to be performed beforehand. For example, in a color copier, it is general procedure that a document is read by a line sensor or the like and reading results as output as additive mixture signals of RGB (red, green, and blue). On the other hand, image outputting is performed based on subtractive mixture signals of CMYK (cyan, magenta, yellow, and black). Therefore, color conversion processing in a color copier is performed with an assumption that particular input/output sections such as the above-mentioned ones are used. That is, a color conversion circuit is so adjusted that a test pattern (an original) and its copy resemble each other to as high a degree as possible.

There exists a wide variety of color input/output media and accordingly there are a variety of image data formats. Because image data are exchanged through a network or the like, it is necessary to perform color conversion processing on various kinds of image data. The typical color spaces used in personal computer are, e.g., RGB, HSL, HSB, XYZ, L*a*b* etc., color spaces that are defined from the RGB space by rearranging calculations, and the CMYK space that use recording colors themselves. With the use of CMYK signals, printed colors may be different if different sets of colorants are used. As such, CMYK signals are device-dependent signals. To use device-dependent signals in another device, it is necessary to specify a corresponding relationship (color matching) between the device-dependent signals and device-independent signals. "Device-independent signals" means signals that can be transformed, by known definitive equations, into signals on a colorimetric color space (CIE XYZ, l*a*b*, etc.).

Figure 1:
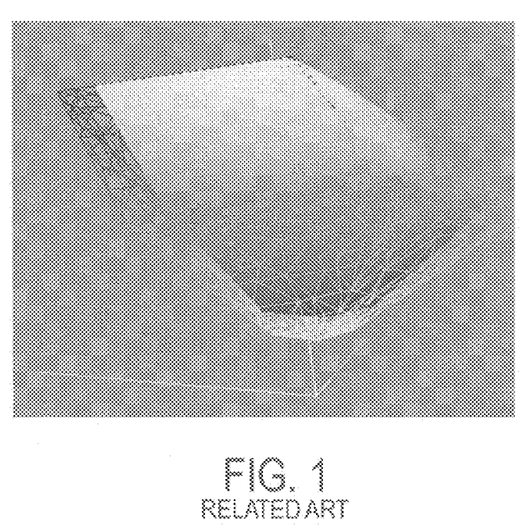
FIG. 1 shows graphical depiction of gamut differences across devices employing color matching methods of the related art.

As indicated above, even with the use of the same CMYK signals sent to multiple printing devices, printed colors may be different if different sets of colorants are used. In other words, because CMYK signals are device-dependent, the actual available color gamut (the subset of colors that can be accurately represented by a given output device) depends not only on the function of how much toner is present in each pixel (the smallest area of print that can be independently colored), but is also a function of the process and media. Internal to the process, the developed mass per unit area on a photoreceptor of a printing device is controlled using common set point targets using, e.g., level 2 control loops. Both level 1 and level 2 control loops are known in the art. See U.S. Pat. No. 5,950,040; U.S. Pat. No. 5,754,918, which are hereby incorporated by reference. The developed mass per unit area ("DMA") depends on the process parameters of each of the color separation printed by the printing device on a media. The process parameters include, for example, photoreceptor voltages (charged and/or discharged voltages), donor and/or magnetic roll voltages, toner concentration, etc. The level 2 process control loops and level 1 process control loops or toner concentration loops generate these process parameters on a real time basis by measuring color patches printed in the inter-document zone with sensors during image printing. However, this process may still give rise to differences in color gamuts across multiple machines. For example, FIG. 1 shows gamut differences across multiple related art machines simulated using a virtual printer model with 9% toner content, represented by solid portion of the graphical depiction and 14% toner content represented by mesh portion of the graphical depiction.

SUMMARY

It would be advantageous to provide a method for matching color gamuts across multiple devices that enhances or improves the quality of printed image output across multiple devices, reduces re-profiling frequency, minimizes loss of details due to unpredictability of gamuts and further minimizes the occurrence of undesirable contours that can occur due to many-to-one mapping at the intersection between mapped colors and in-gamut colors near the gamut boundary, improves color management (contrast, color appearance, etc.), provides improved color stability that may be superior to color stability achieved using related art level 2 process control alone operating with sensors, and enables better matching of spot colors among multiple devices. To address or accomplish these advantages, advantages described below and/or other advantages, the exemplary embodiments may include presetting target additive mixture color space signal values; printing on a medium first color patches of subtractive mixture color space separation; sensing the color patches to produce as an output sensed additive mixture signal values; comparing the sensed additive mixture signal vales with the target additive mixture signal values; producing an error signal containing a value representing the difference between the target signal values and the sense signal values; multiplying the error signal by a gain to produce a gain signal; integrating the gain signal to produce an integrated signal; adding the integrated signal with a nominal actuator value signal to yield actuator values; and sending actuator values as DMA target inputs to level 2 controllers of multiple printers to actuate the DMA target values of the printers, wherein the controllers employ the actuator values as DMA target set points for each of the color space separation; whereby the printers print on a medium second color patches as using the actuated DMA target values to produce an output of the control system.

An exemplary embodiment may include presetting target additive mixture color space signal values; printing on a medium first color patches of subtractive mixture color space separation; sensing the color patches to produce as an output sensed additive mixture signal values; comparing the sensed additive mixture signal values with the target additive mixture signal values; producing an error signal containing a value representing the difference between the target signal values and the sensed signal values; multiplying the error signal by a gain to produce a gain signal; integrating the gain signal to produce an integrated signal; comparing the integrated signal with a nominal actuator value signal to yield actuator values; and sending actuator values as DMA target inputs to level 2 controllers of multiple printers to actuate the DMA target value of the printers, wherein the controllers employ the actuator values as DMA target set points for each color space separation; whereby the printers print on a medium second color patches using the actuated DMA target values to produce an output of the control system; sensing the second color patches to produce as an output second sensed additive mixture signal values; and repeating the comparing, producing an error signal, multiplying the error signal, integrating the gain signal, adding the integrated signal with a nominal actuator value signal to yield actuator values, and sending the actuator values to level 2 controls the printers to actuate the DMA targets of the printers to produce an output of the control system.

Another exemplary embodiment may include presetting target additive mixture color space signal values; printing on a medium first color patches of subtractive mixture color space separation; sensing the color patches to produce as an output sensed additive mixture signal values; comparing the sensed additive mixture signal values with the target additive mixture signal values; producing an error signal containing values representing the difference between the target signal values and the sensed signal values; multiplying the error signal by a gain to produce a gain signal; integrating the gain signal to produce an integrated signal; adding the integrated signal with a nominal actuator value signal to yield actuator values; and sending actuator values as DMA target inputs to level 2 controllers of multiple printers to actuate the DMA target value of the printers, wherein the controllers employ the actuator values as DMA target set points for each color space separation; whereby the printers print on a medium second color patch as using the actuated DMA target values to produce an output of the control system; sensing the second color patches to produce as an output second sensed additive mixture signal values; and repeating the comparing, producing an error signal, multiplying the error signal by a gain to produce a gain signal, integrating the gain signal, adding the integrated signal with a nominal actuator value signal to yield actuator values, and sending the actuator values to level 2 controllers of the printers to actuate the DMA targets of the printers to produce an output of the control system; and employing the above-described method as a feedback control algorithm (Automated Matching with Set points as Actuators control loop ("AMSA")) recorded on a computer readable medium for processing by a computer to which a plurality of printers are connected, each of the plurality of printers having level 2 controllers wherein the controllers control developed mass per unit area on photoreceptors of the printers based on DMA target values; the printers having an inline sensor for sensing printed color separations and producing a signal corresponding to the sensed additive mixture signal values wherein the sensed additive mixture signal is sent to the computer for entry into the AMSA control loop whereby the AMSA control loop compares the target additive mixture color space signal values with the sensed additive mixture signal to yield an error signal value that is multiplied by a gain, and integrated to yield an integrated signal, the integrated signal being added to nominal actuator values to yield an actuator value signal that is sent to each of the plurality of printers for actuating the DMA target values of the level 2 controller of each printer for printing adjusted color space separation during printing.

Exemplary embodiments are described herein with respect to architecture of graphic or electrophotographic print engines. However, it is envisioned that any imaging system that may incorporate the color matching method, system and apparatus described herein are encompassed by the scope and spirit of the exemplary embodiments.

The patent application file contains at least one drawing executed in color. Copies of this patent or patent application publication with color drawings will be provided by the Office upon request and payment of the necessary fee.

EMBODIMENTS

The exemplary embodiments are intended to cover all alternatives, modifications and equivalents as may be included within the spirit and scope of the methods, system and apparatus defined herein.

For understanding of the methods, system and apparatus for matching color gamuts of multiple devices, reference is made to the drawings. In the drawings, like reference numerals have been used throughout to designate similar or identical elements. The drawings depict various embodiments of illustrative methods, systems and experimental results yielded from employment of such methods, systems and associated apparatuses incorporating the features of the exemplary embodiments therein. As shown, the drawings schematically depict digital imaging system architecture that has various features. In as much as the art of printing is well known, the various processing stations employed in printing machines will be schematically shown herein and their operation described with reference thereto.

Figure 2:
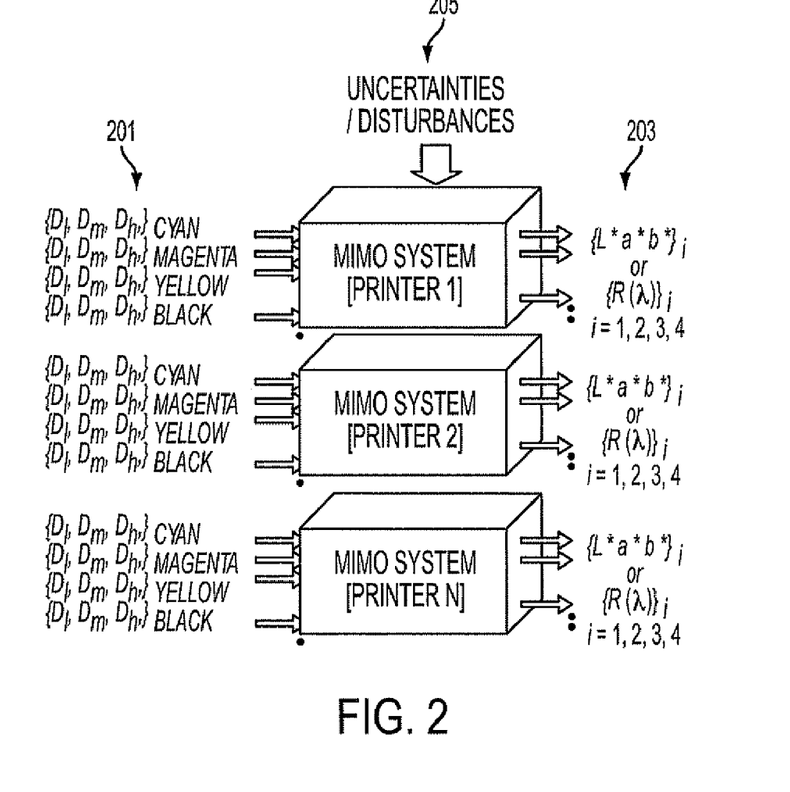
FIG. 2 shows a plan view of a color matching system in accordance with an exemplary embodiment.

Referring to FIG. 2, a conceptual diagram of the proposed system in accordance with an exemplary embodiment is shown. This system uses a high level state feedback control loop or AMSA to estimate new DMA targets for controllers of multiple image output devices, e.g., printing devices. The AMSA accounts for variations in the development process and may reduce the color variations between the time an image developed in the photoreceptor to the time when the image is fused to a medium. The AMSA in accordance with an exemplary embodiment uses a 12-input, 12-output state feedback control for this purpose. The 12 inputs are actuators 201 of the controller. In other words, actuators 201 are the DMA targets/set point at three tone levels; low (0% to 20%), mid (50%) and high (100%), each corresponding to the four separations of the CMYK color space. The 12 outputs are sensed additive mixture signal values 203. The sensed values 203 may be the L*a*b* values, and may correspond to four colors that best represent the movement of the gamuts across multiple printing devices 205. The CMYK values of the four colors may be chosen a priori based on the variations and the gamuts. All 12 actuators may be calculated simultaneously using the color values printed by any of the multiple printing devices 205 on a printing medium.

Specifically, one of the multiple printers 205 may be caused to print patches corresponding to four colors a medium, and further cause the printers to measure the four patches using inline sensors. The measurements are compared to target values to yield an error signal that is given as an input to the AMSA control loop to obtain actuator values 201. In a time-hierarchal control system, actuator values 201 may be given as targets to the individual level 2 controllers of one or more of the multiple printers 205 for each color separation. Upon stabilization of the level 2 controllers, the outer AMSA control loop may be caused to update the targets by closing the loop to obtain new actuator values 201. It is conceivable that in some implementation of AMSA like control loops, there could be lower or higher than 12 inputs and lower or higher than 12 outputs.

Figure 3:
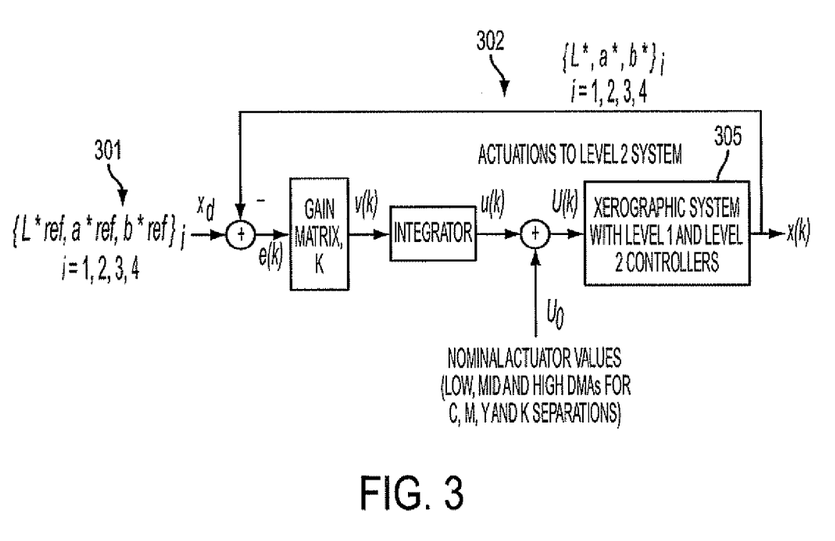
FIG. 3 shows a plan view of an AMSA control loop in accordance with an exemplary embodiment.

With regard to FIG. 3, a block diagram of an AMSA control loop in accordance with an exemplary embodiment is shown. As shown in FIG. 3, x(k) represents the states and output of the control system. Specifically, $x(k)=[L^*_1(k)a_1^*(k)b_1^*(k) L_2^*(k)a_2^*(k)b_2^*(k)L_3^*(k)a_3^*(k)b_3^*(k)L^*_4(k)a^*_4(k)b^*_4(k)]^T$ represents the states and output of the control system. With further regard to FIG. 3, i=1, 2, 3, 4 represent the measurements of the four color separations chosen to be tracked and matched using an AMSA loop in accordance with an exemplary embodiment and k represents the iteration number of the loop. The vector, $x_d=[L_{1ref}^*a_{1ref}^*b_{1ref}^*L_{2ref}^* a_{2ref}^*b_{2ref}^*L_{3ref}^*a_{3ref}^*b_{3ref}^*L_{4ref}^*a_{4ref}^*b^*_{4ref}]^T$ is the target vector of the colors.

This represents target additive mixture color space signal value corresponding to the L*a*b* color space. Target additive mixture color space signal value 301 may be preset or predetermined. The actuator signals are given by the actuator vector $U(k)=[D_1^C(k)D_m^C(k)D_h^C(k)D_l^M(k)D_m^M(k)D_h^M(k) D_l^Y(k)D_m^Y(k)D_h^Y(k)D_l^K(k)D_m^K(k)D_h^k(k)]^T$. $U_0$ represents the nominal actuator vector. As such, the actuator updates can be input to multiple print devices, e.g., xerographic system 305, may be obtained using the following control algorithm:

$$U(k)=U_0+u(k)$$

$$u(k+1)=u(k)+v(k)$$

$$v(k)=Ke(k)$$

$$e(k)=x_d-x(k)$$

Upon input of the actuator signals into the controllers of the xerographic systems 305 a sensed additive mixture signal value output 307 may be obtained.

Sensed additive mixture signal value output 307 may be compared with vector $x_d$ to yield an error signal e(k). The error signal may be multiplied by a gain matrix to yield a value v(k), which may then be integrated and added with nominal actuator value $U_0$ to yield actuator signal U(k).

The gain matrix K of the state feedback control of FIG. 3 may be determined from a Jacobian matrix of the xerographic system 305 having hierarchal level 1 and level 2 control loops included in the system. Often level 1 control system may not be included. In such situations, level 2 controller alone is designed to track the DMA target setpoints. The Jacobian matrix describes the behavior of the system at a nominal operating point to a first degree. Each element is the derivative of each output with respect to each input. As such, the Jacobian matrix for an AMSA loop in accordance with an exemplary embodiment has a dimensionality of 12×12 as shown in the following equation:

$$J = \begin{bmatrix} \frac{\partial L_1^*}{\partial D_l^C} & \frac{\partial L_1^*}{\partial D_m^C} & \cdots & \frac{\partial L_1^*}{\partial D_h^K} \\ \frac{\partial a_1^*}{\partial D_l^C} & \frac{\partial a_1^*}{\partial D_m^C} & \cdots & \frac{\partial a_1^*}{\partial D_h^K} \\ \vdots & \vdots & \ddots & \vdots \\ \frac{\partial b_4^*}{\partial D_l^C} & \frac{\partial b_4^*}{\partial D_m^C} & \cdots & \frac{\partial b_4^*}{\partial D_h^K} \end{bmatrix}_{12\times 12}$$

Numerical methods may be used to determine the Jacobian matrix on a process model. Other experimental approaches, as described in L K Mestha, et al, "Sensitivity matrix determination for adaptive color control", Xerox Doc# 20071048-US-NP, Filed December 2007, the subject matter of which is incorporated herein by reference, can be used for measuring the Jacobian matrix for the process control system. For numerical methods, the actuator values may be set at a nominal operating point $U_0$. Each column of the Jacobian matrix may be obtained by varying each of the actuator values around the nominal value while keeping the other actuator values at their nominal values. The difference of the output is determined at the actuator settings and is divided by the total difference in the changed actuator value. This process may be continued until all 12 columns of the Jacobian matrix are elucidated, each corresponding to one actuator.

Xerographic systems 305 may include level 1 and level 2 controllers. Level 2 control loops have limited actuation for reasons such as saturation of PIDC and instability of level 1 control loops beyond circuit limits. The PIDC is a Photo Induced Discharge Curve, that represents the discharge characteristic of the photo receptor due to exposure to a light source. The PIDC is expressed as a nonlinear function representing the discharged surface voltage of a photoreceptor as a function of the exposure light intensity. As such, the feasible region for a combined target of DMA at low, mid and high area coverages is small. If DMA targets requested by the AMSA loop are not in this feasible region, the level 2 control loop may lapse into instability. As such, the Nelder-Meade simplex technique may be used, as discussed in Dimitri P. Bertsekas, "Nonlinear Programming," Second Edition, Athena Scientific, Belmont, Mass., 1999. The original work for reference [2] is credited to: J. A. Nelder and R. Mead, "A simplex method for function minimization," Computer Journal. 7:308-313. 1965, the subject matter of which is incorporated herein by reference. This may allow mapping the required DMA targets to the closest DMA values inside the feasible region.

Figure 4A:
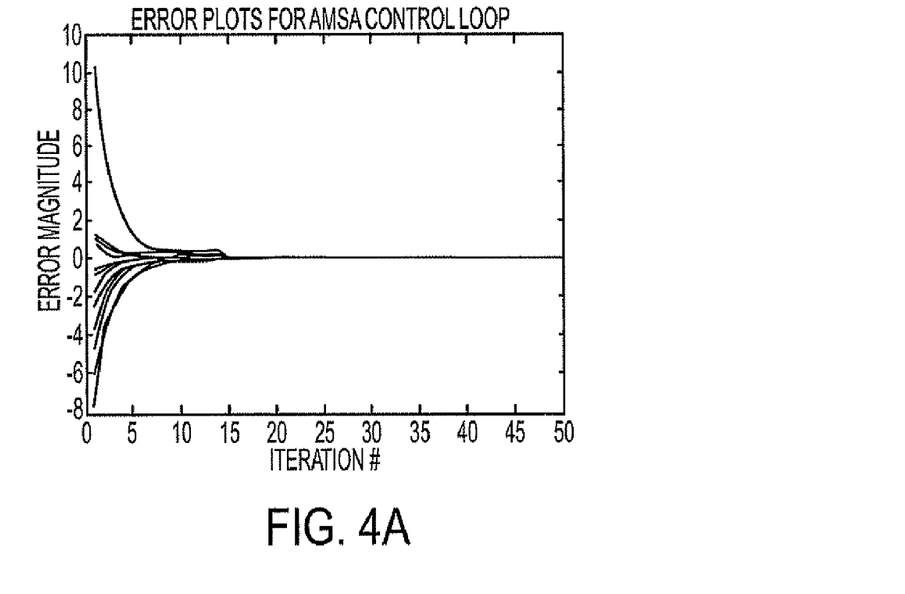
FIG. 4(a) graphically depicts exemplary error plot for an AMSA control loop in accordance with an exemplary embodiment.
Figure 4B:
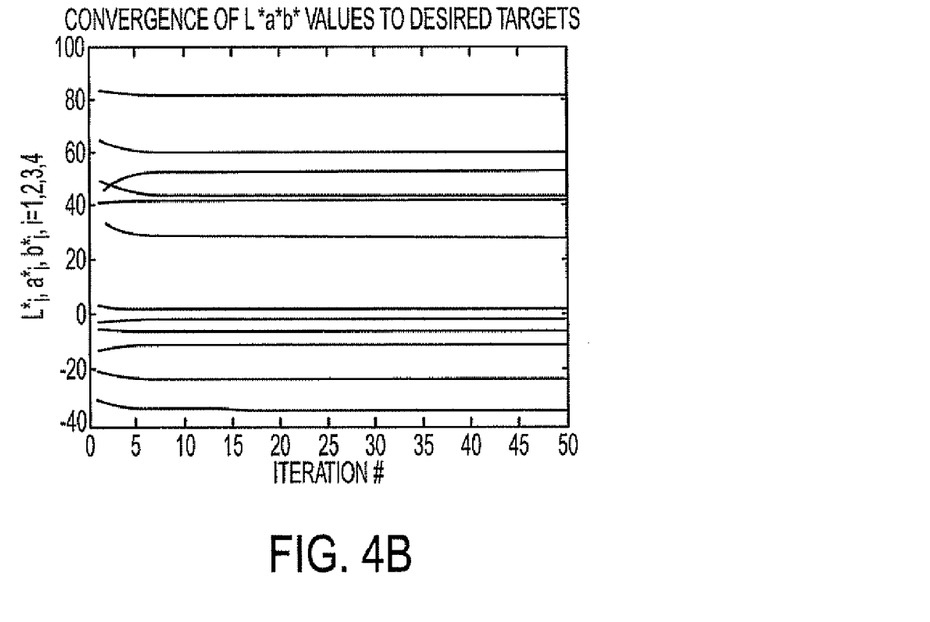
FIG. 4(b) graphically depicts plots of L*a*b* value as they converge to desired targets in accordance with a method of an exemplary embodiment.
Figure 5A:
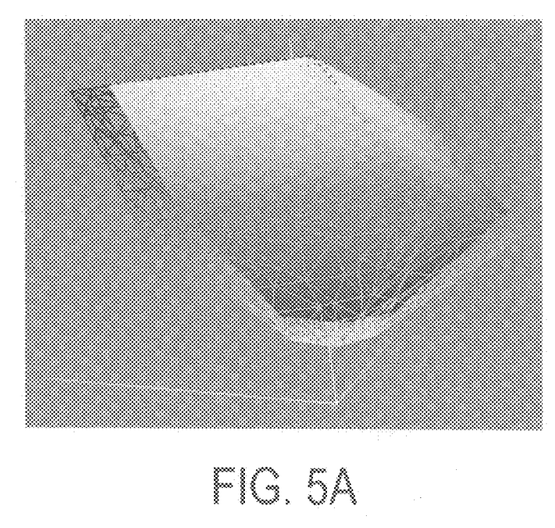
FIG. 5(a) shows color gamut for multiple devices before employing an AMSA control loop in accordance with an exemplary embodiment.
Figure 5B:
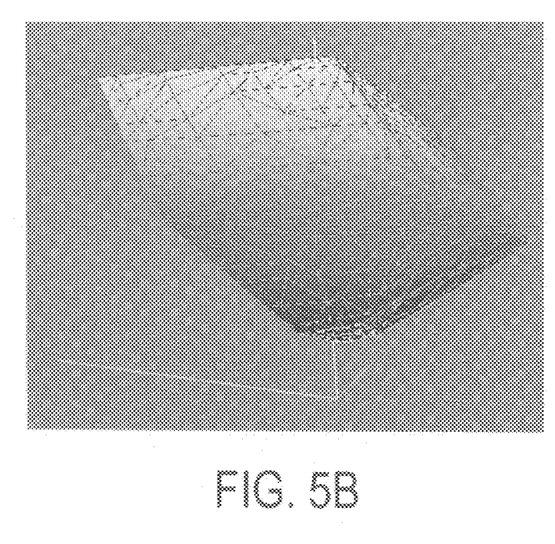
FIG. 5(b) shows color gamut for multiple devices after employing an AMSA control loop in accordance with an exemplary embodiment.

In a demonstration in accordance with an exemplary embodiment, two cases were considered. Four color patches (C, M, Y, K) were used to run an AMSA loop, with values of {100%, 20%, 20%, 20%}, {20%, 100%, 20%, 50%}, {20%, 20%, 100%, 20%}, {50%, 50%, 50%, 100%}. These particular color patches were chosen in order to track the changes L*a*b* values of respected DMAs at low (20%), mid (50%) and high (100%) tones of all four color separations. In case 1, the toner curves of each separation were increased from 9% to 14% to obtain the reference gamut. Error plots for the 12 outputs/states are shown in FIG. 4(a), of plots L*a*b* values versus iteration number for all the four color patches are shown in FIG. 4(b). The residual CIE ΔE errors for the four color patches are 0.00004, 0.00003, 0.00004, and 0.00004. The color gamuts before implementing the AMSA control loop and after implementing the AMSA control loop are shown in FIGS. 5(a) and 5(b), respectively. The solid gamut represents the original gamut of one machine (9% TC) and the mesh gamut represents the gamut of another machine (14% TC), and also is the reference gamut. FIG. 5(b) shows that the gamuts of the two machines are matched by the AMSA control loop in accordance with an exemplary embodiment. To make a quantitative comparison, 1617 color patches in the GRAYCoL color set were used to calculate the CIE ΔE statistics presented in Table 1 below.

TABLE 1

CIE ΔE statistics for the colors of GRAYCoL color set before and after AMSA

|  | $\Delta E_{mean}$ | $\Delta E_{max}$ | $\Delta E_{95\%}$ |
| --- | --- | --- | --- |
| Before AMSA | 5.8926 | 12.1716 | 9.2589 |
| After AMSA | 0.0338 | 0.0911 | 0.0676 |

Figure 6A:
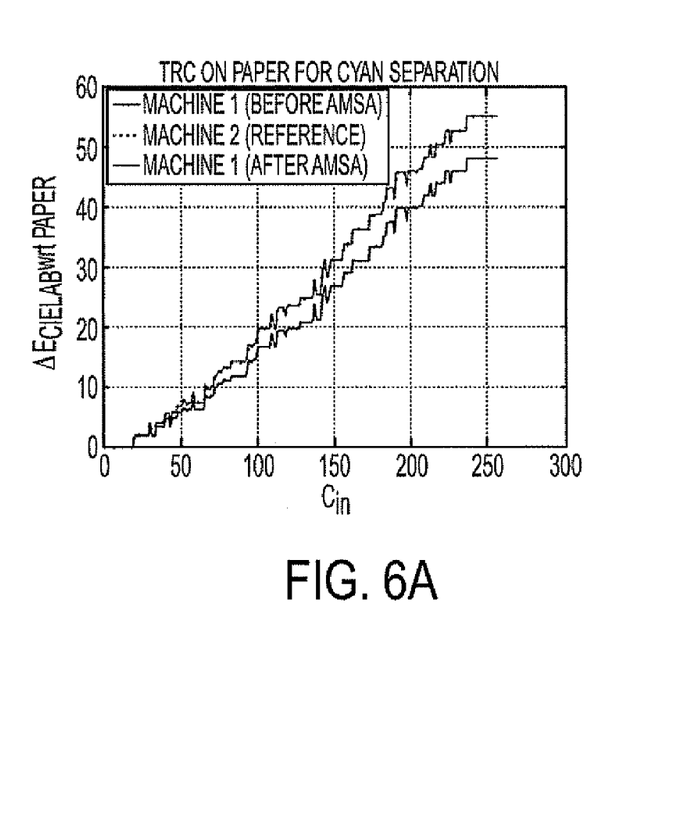
FIG. 6(a) shows tone response curves for cyan separation on printed paper.
Figure 6B:
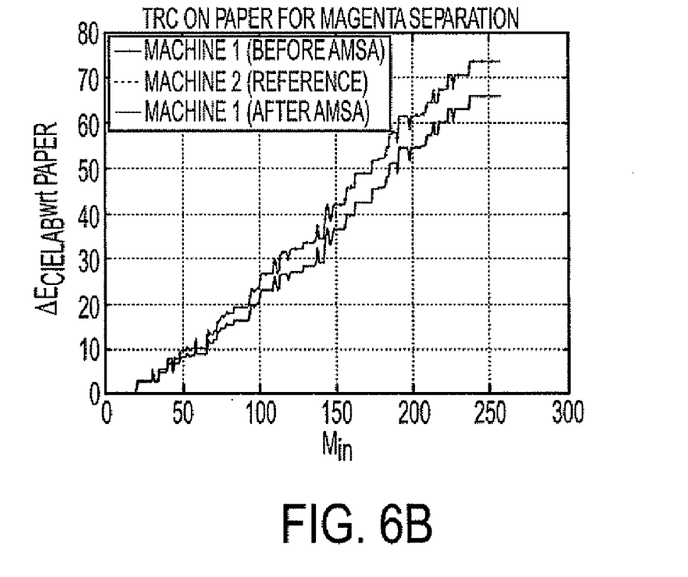
FIG. 6(b) shows tone response curves for magenta color separation on printed paper.
Figure 6C:
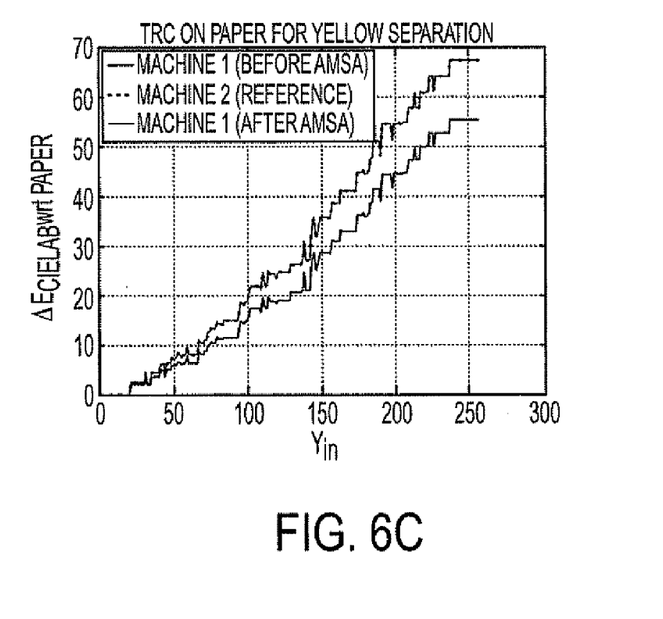
FIG. 6(c) shows tone response curves for yellow color separation on printed paper.
Figure 6D:
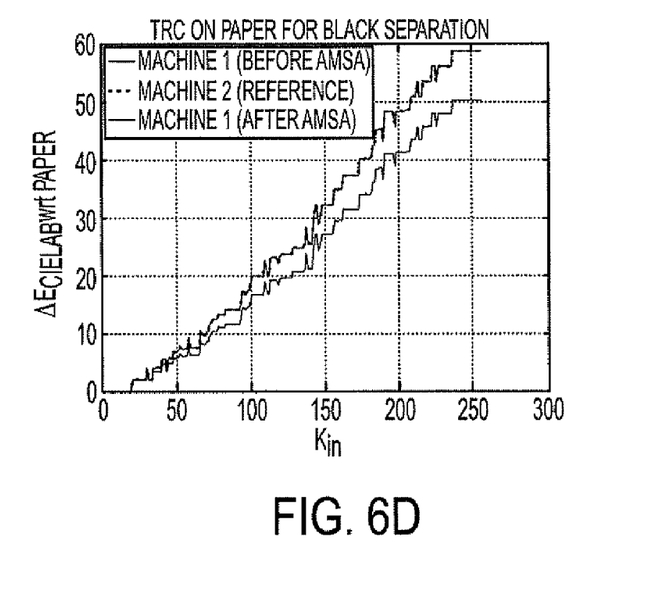
FIG. 6(d) shows tone response curves for black color separation.

Another method of quantitatively comparing the gamut matching is to consider the tone response curve (TRC) for each separation on paper. For this purpose, each point of the TRC on paper is defined by the CIE ΔE of printed patches with particular coverage area for each separation from the paper. FIGS. 6(a), (b), (c), and (d) show the TRC plots of the four C, M, Y and K color separations, respectively, for a first machine before AMSA control, a second machine (reference machine) and the first machine after AMSA control. The TRCs for machine 1 are matched to those of machine 2 after running an AMSA control loop in accordance with an exemplary embodiment.

In case 2, the reference gamut was obtained by increasing the TC of yellow separation from 9% to 14% while keeping the TC of the other separations at 9% itself.

Figure 7A:
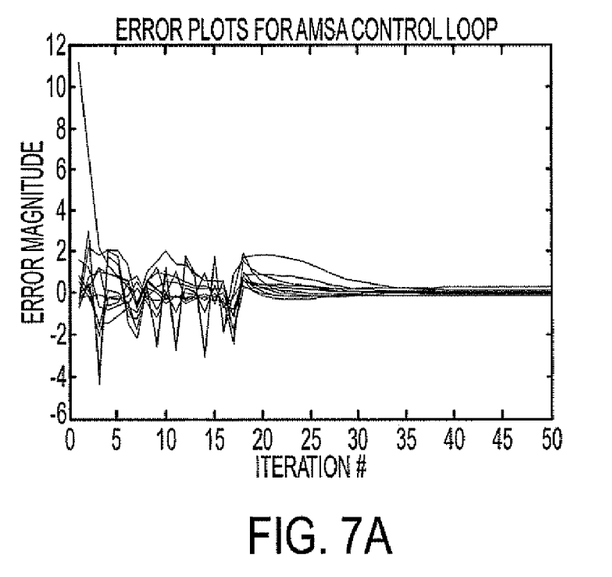
FIG. 7(a) graphically depicts error plots for an AMSA control loop in accordance with an exemplary embodiment.
Figure 7B:
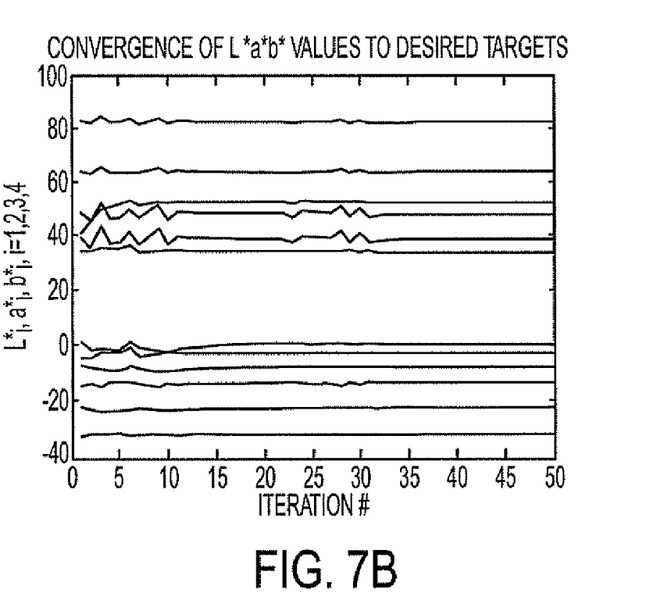
FIG. 7(b) graphically depicts L*a*b* value plots for four color separation employing an AMSA control loop in accordance with an exemplary embodiment.
Figure 8A:
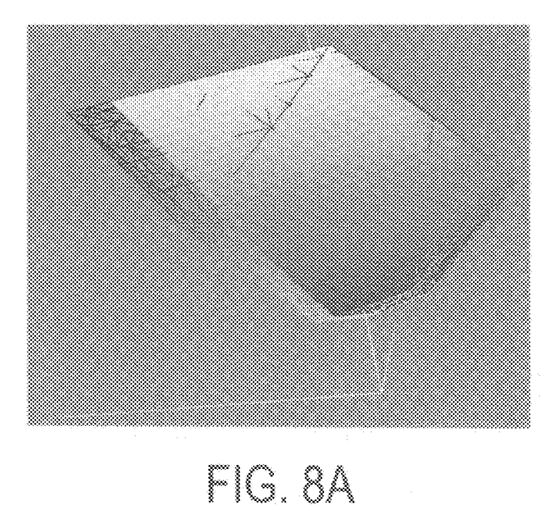
FIG. 8(a) shows gamuts of two machines before matching by employing the AMSA control loop in accordance with an exemplary embodiment.

Error plots for the 12 outputs/states are shown in FIG. 7(a) while the plot L*a*b* values versus iteration number for all the four color patches are shown in FIG. 7(b). The residual CIE ΔE errors for the four color patches are 0.0849, 0.3660, 0.1608, and 0.2328. The color gamuts before implementing the AMSA control loop and after implementing the AMSA control loop can be seen in FIGS. 8(a) and 8(b), respectively. The solid gamut represents the original gamut of one machine (9% TC-C, M, Y, and K) and the mesh gamut represents the gamut of another machine (9% TC-C, M, and K, 12% TC-Y) and also is the reference gamut.

Figure 8B:
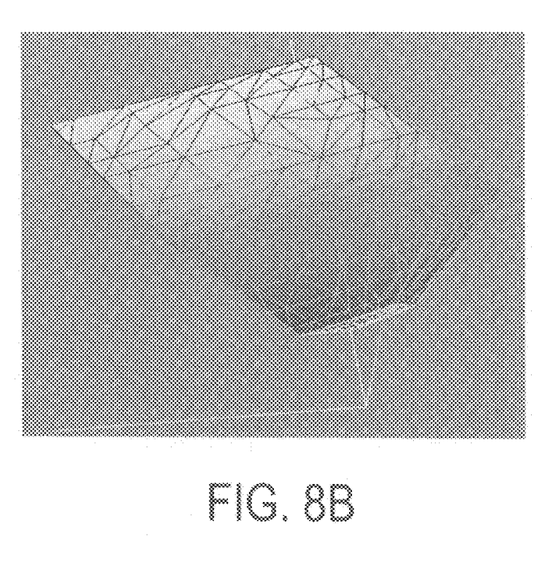
FIG. 8(b) shows the gamuts of two machines matched by the AMSA control loop in accordance with an exemplary embodiment.

FIG. 8(b) shows that the gamuts of the two machines are matched by the AMSA control loop in accordance with an exemplary embodiment. The CIE ΔE statistics for GRAYCoL are presented in Table 2 below.

TABLE 2

CIE ΔE statistics for the colors of GRAYCoL color set before and after AMSA

|  | $\Delta E_{mean}$ | $\Delta E_{max}$ | $\Delta E_{95\%}$ |
| --- | --- | --- | --- |
| Before AMSA | 3.8467 | 12.1716 | 11.1496 |
| After AMSA | 1.1362 | 3.5247 | 2.1125 |

Figure 9A:
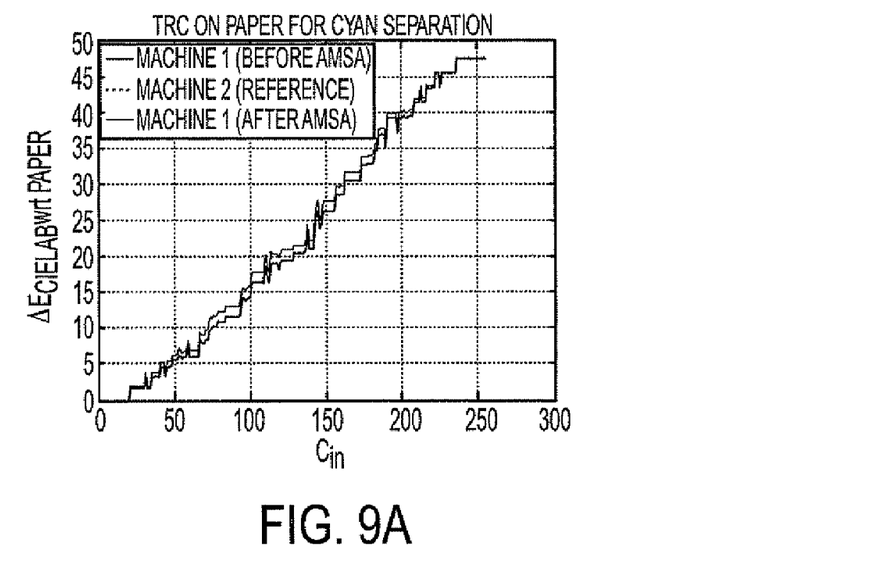
FIG. 9(a) shows toner response curves for cyan color separation on printed paper.
Figure 9B:
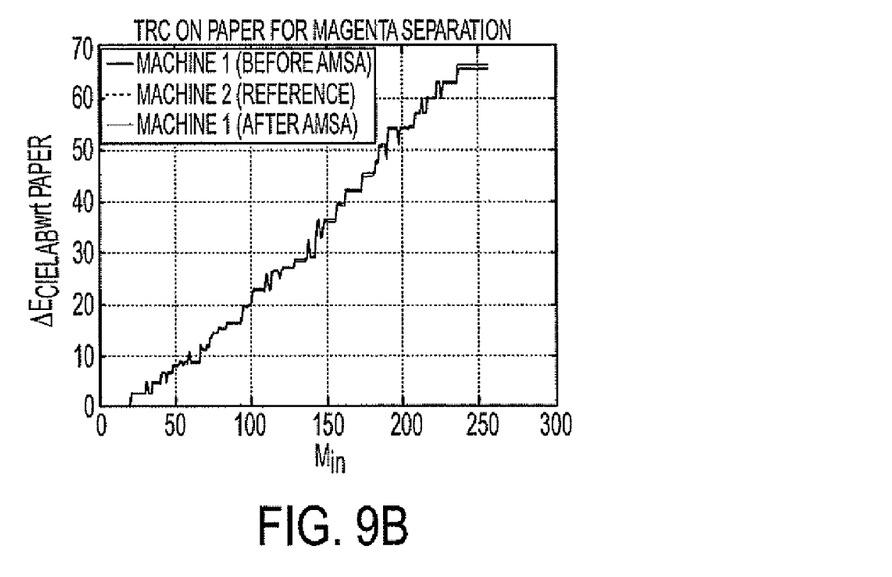
FIG. 9(b) shows toner response curves for magenta color separation on printed paper.
Figure 9C:
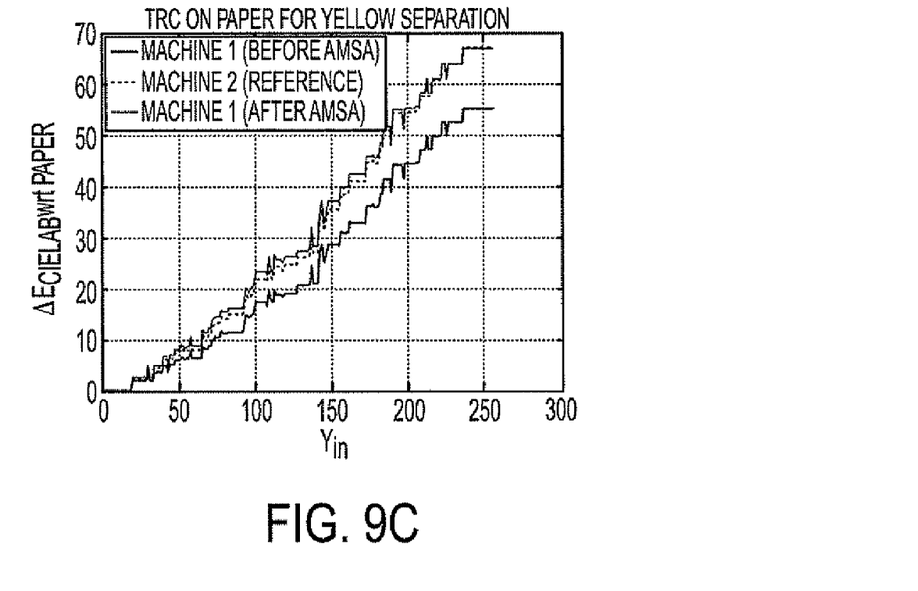
FIG. 9(c) shows toner response curves for yellow color separation on printed paper.
Figure 9D:
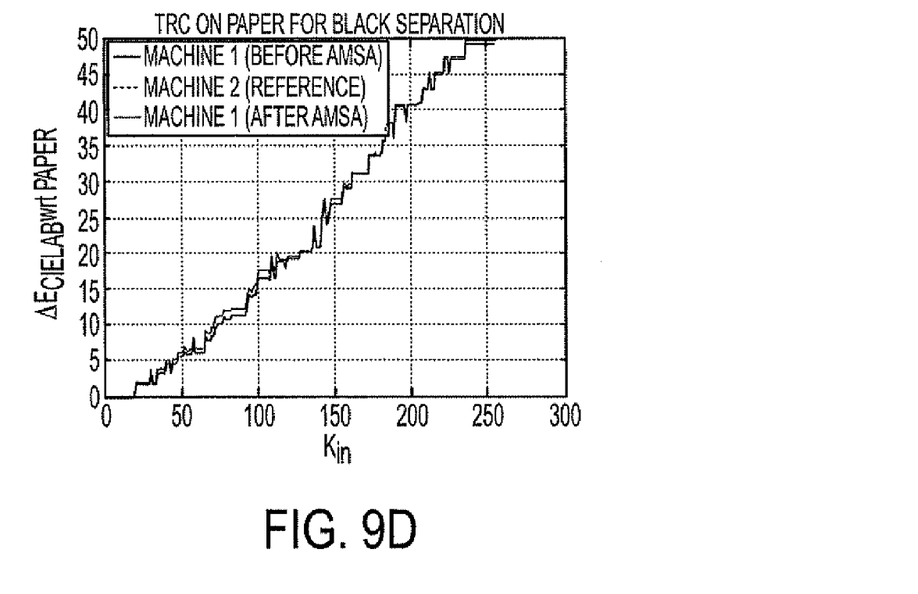
FIG. 9(d) shows toner response curves for black color separation on printed paper.

FIGS. 9(a), (b), (c), and (d) show the TRC plots of the four C, M, Y, and K separations, respectively, for machine 1 before employing the AMSA loop in accordance with an exemplary embodiment, machine 2 (reference machine) and machine 1 after employing the AMSA control loop in accordance with an exemplary embodiment. The tone response curves or TRCs for CMYK separations do not change for machines 1 and 2 because TC is maintained constant for the separations. TC for yellow separation is changed and hence, the TRC change between the machines in FIG. 9(c). It may be observed that the yellow TRC for machine 1 matches that of machine 2 after running an AMSA control loop while still keeping the other TRCs constant.

For purposes of explanation, in the above description, numerous specific details were set forth in order to provide a thorough understanding of the method, system and apparatus for matching of color gamuts across a plurality of image output devices. It will be apparent, however, to one skilled in the art that color match as described above can be practiced without the specific details. In other instances, well-known structures and devices are shown in block diagram form in order to avoid obscuring the described method, system and apparatuses.

While color matching has been described in conjunction with specific embodiments thereof, it is evident that many alternatives, modifications, and variations will be apparent to those skilled in the art. Accordingly, embodiments of the method, system, and apparatus as set forth herein are intended to be illustrative, not limiting. There are changes that may be made without departing from the spirit and scope of the exemplary embodiments.

It will be appreciated that several of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A control system method for adjusting gamuts of a plurality of printers to match gamuts across the plurality of printers, the method comprising:

presetting target additive mixture color space signal values;

printing on a medium first color patches of subtractive mixture color space separations;

sensing the color patches to produce as an output sensed additive mixture signal values;

producing actuator values as DMA targets by processing the sensed additive mixture signal values and the target additive mixture signal values in a feedback controller; and sending the actuator values as DMA target inputs to level 2 controllers of the printers to actuate the DMA target values of the printers, wherein the controllers employ the actuator values as DMA target set points for each of the color space separation;

whereby the printers print on a medium second color patches using the actuator DMA target values to produce a control system output.

2. The control system method for adjusting gamuts of a plurality of printers to match gamuts across the plurality of printers of claim 1, the producing actuator values further comprising the steps of:
comparing the sensed additive mixture signal values with the target additive mixture signal values;
producing an error signal containing a value representing the difference between the target signal values and the sensed signal values;
multiplying the error signal by a gain to produce a gain signal;
integrating the gain signal to produce an integrated signal;
adding the integrated signal with a nominal actuator value signal to yield actuator values as DMA target inputs to level 2 controllers of the printer.

3. The control system method for adjusting gamuts of a plurality of printers to match gamuts across the plurality of printers of claim 1, the method further comprising:
sensing the second color patches to produce as an output second sensed additive mixture signal value; and
repeating the processing in the feedback controller to yield actuator values, sending the actuator values to level 2 controls of the printers to actuate the DMA targets of the printers to produce an output of the control system.

4. The control system method for adjusting gamuts of a plurality of printers to match gamuts across the plurality of printers of claim 3, the method further comprising:
comparing the sensed additive mixture signal value with target additive mixture color space signal values, producing an error signal, multiplying the error signal, integrating the gain signal, comparing the integrated signal with a nominal actuator value of signal to yield actuator values.

5. The control system method for adjusting gamuts of a plurality of printers to match gamuts across the plurality of printers of claim 1, wherein the method is employed when an toner cartridge of one of the plurality of printers is replaced.

6. The control system method for adjusting gamuts of a plurality of printers to match gamuts across the plurality of printers in accordance with claim 1, wherein the method is employed when every print request is sent to one of the plurality of printers.

7. The control system method for adjusting gamuts of a plurality of printers to match gamuts across the plurality of printers of claim 1, wherein both the target additive mixture color space signal values and the sensed additive mixture signal values correspond respectively to signals on a L*a*b* colorimetric color space.

D'a*V.

8. The control system method for adjusting gamuts of a plurality of printers to match gamuts across the plurality of printers of claim 1, wherein the subtractive mixture separations are cyan, magenta, yellow, and black.

9. The method for adjusting gamuts of a plurality of printers to match gamuts across the plurality of printers of claim 1, wherein the actuator values correspond to low, medium, and high tone levels for each of the subtractive mixture separations cyan, magenta, yellow, and black; and
wherein the sensed additive mixture signal values correspond to all 12 actuator values.

10. The method for adjusting gamuts in a plurality of printers to match gamuts across the plurality of printers of claim 1, wherein the actuator values are calculated simultaneously.

11. An apparatus having a feedback control algorithm recorded on a computer readable medium for changing color gamuts of networked printing devices, the apparatus comprising:
a plurality of printers having system controllers, the system controllers including level 2 controllers;
an inline sensor disposing each of the plurality of printers for sensing printed color patches;
a computer for communicating with the plurality of printers and for processing the feedback control algorithm to actuate DMA target values;
wherein the level 2 controllers control developed mass per unit area on a photoreceptor of one of the plurality of printers based on DMA target values;
whereby the inline sensor outputs a signal corresponding to the sensed additive mixture signal values yielded from the color patches, wherein the sensed additive mixture signals descend to the computer for entry into the feedback control algorithm, and whereby the feedback control algorithm the actuator value signals that are sent to each of the plurality of printers for actuating the DMA target values for printing adjusted color space separations.

12. The apparatus having a feedback control algorithm recorded on a computer readable medium of claim 11, wherein the feedback control algorithm compares target additive mixture color space signal values with the sensed additive mixture signal to yield an error signal value that is multiplied by a gain, and integrated to yield an integrated signal, the integrated signal being added with nominal actuator values to yield actuator value signals for actuating the DMA target values.

13. A system for changing the gamuts of a plurality of printers across a population of printers, the system comprising the steps of:
providing actuator input values to a plurality of printers having controllers for controlling developed mass per unit area on a photoreceptor based on DMA target set points, whereupon provision of the actuator input values, the DMA target set points are actuated to provide adjusted DMA target value;
applying adjusted DMA target values during printing of color separations by each of the plurality of printers; and
sensing output values of color separations using an inline sensor disposed in each of the plurality of printers.

* * * * *